(12) United States Patent
Yoshitomi et al.

(10) Patent No.: US 6,390,923 B1
(45) Date of Patent: May 21, 2002

(54) MUSIC PLAYING GAME APPARATUS, PERFORMANCE GUIDING IMAGE DISPLAY METHOD, AND READABLE STORAGE MEDIUM STORING PERFORMANCE GUIDING IMAGE FORMING PROGRAM

(75) Inventors: Kensuke Yoshitomi, Yokohama; Kazuya Kubo, Shibuya-ku; Takahiro Omori, Setagaya-ku, all of (JP)

(73) Assignee: Konami Corporation, Tokyo-to (JP)

( * ) Notice: Subject to any disclaimer, the term of this patent is extended or adjusted under 35 U.S.C. 154(b) by 0 days.

(21) Appl. No.: 09/695,461

(22) Filed: Oct. 24, 2000

(30) Foreign Application Priority Data

Nov. 1, 1999 (JP) ............................................. 11-310586

(51) Int. Cl.$^7$ .................................................. A63F 9/24
(52) U.S. Cl. ........................ 463/43; 463/30; 434/307 R
(58) Field of Search ................................. 463/1, 30–31, 463/35, 43; 434/307 A, 307 R, 315, 318, 365, 309, 308; 84/610–611, 634–635, 650–651

(56) References Cited

U.S. PATENT DOCUMENTS

| | | | | | |
|---|---|---|---|---|---|
| 4,520,501 A | * | 5/1985 | DuBrucq | ...................... | 381/48 |
| 4,656,535 A | * | 4/1987 | Usui | .......................... | 360/72.1 |
| 5,142,961 A | * | 9/1992 | Paroutaud | ..................... | 84/726 |
| 5,177,312 A | * | 1/1993 | Kozuki | .......................... | 84/610 |
| 5,214,231 A | | 5/1993 | Ernst et al. | | |
| 5,270,475 A | | 12/1993 | Weiss et al. | | |
| 5,278,347 A | * | 1/1994 | Konishi | ....................... | 84/613 |
| 5,300,723 A | * | 4/1994 | Ito | ............................... | 84/601 |
| 5,355,762 A | * | 10/1994 | Tabata | .......................... | 84/609 |
| 5,585,583 A | | 12/1996 | Owen | | |
| 5,728,960 A | * | 3/1998 | Sitrick | ....................... | 84/477 R |
| 5,739,457 A | | 4/1998 | Devecka | | |
| 5,773,742 A | | 6/1998 | Eventoff et al. | | |

FOREIGN PATENT DOCUMENTS

JP 2000-014931 1/2000

OTHER PUBLICATIONS

Weekly Fami–Tsu, the 14$^{th}$ vol., No. 31$^{st}$1999 (dated Jul. 30), pp. 238, and 239.

* cited by examiner

*Primary Examiner*—Joe H. Cheng
*Assistant Examiner*—Kim T. Nguyen
(74) *Attorney, Agent, or Firm*—Jordan and Hamburg LLP

(57) ABSTRACT

A music playing game apparatus comprises background music reproducing unit; display unit for displaying an image stored in the storage medium; control unit for reading a content of recorded information in a storage medium storing a plurality of simulated music instruments played by a player and for executing a predetermined operation to the display unit and the background music reproducing unit upon receiving an operation signal from the simulated music instrument. The control unit includes a pattern storage unit for storing operation instruction pattern to instruct an operation of the simulated music instrument; a sound information storage unit for storing playing sounds of the simulated music instrument; a display control unit for reading out the operation instruction pattern corresponding to the background music to be reproduced, and for displaying the operation instruction; playing sound output unit for outputting a playing sound from the sound information storage unit at a time of operation of the music instrument in accordance with the operation instruction pattern displayed on the display control unit.

11 Claims, 13 Drawing Sheets

MUSIC PLAYING GAME APPARATUS, PERFORMANCE GUIDING IMAGE DISPLAY METHOD, AND READABLE STORAGE MEDIUM STORING PERFORMANCE GUIDING IMAGE FORMING PROGRAM

The present invention relates to a music playing game technique of operating a simulated music instrument to the accompaniment of a background music being reproduced.

BACKGROUND OF THE INVENTION AND RELATED ART STATEMENT

There have been widely known a variety of game apparatuses including game apparatuses for commercial use in which a monitor and loudspeakers are assembled into a main game unit and those for home use in which a monitor and loudspeakers are constructed separately from a main game unit.

In recent years, the game apparatuses for commercial use have adopted games with the object of letting a game player operate a simulated musical instrument in accordance with a music to enjoy the game. Such games include a guitar playing game in which a game player is in charge of guitar sounds and a drum playing game in which a game player is in charge of drum sounds.

In the game apparatuses of this type, a background music is reproduced and contents of instrument playing operations added to the background music being reproduced in synchronism therewith are displayed on a display screen of the monitor. These game apparatuses let the game players think as if they were playing musical instruments.

The applicant of the present application proposed a music game apparatus, in which a guitar playing game apparatus and a drum playing game apparatus are linked via a communication line so that two players can play different musical instruments to the same background music played on monitors of the respective game apparatuses, in Japanese Unexamined Patent Publication No. 11-037935.

However, this is merely a game which is played while linking two game apparatuses by operating one main game unit and communicating the contents of the background music with the other main game unit in synchronism with the operation of the one main game unit. It is basically a condition that two game apparatuses exist, and such a game is merely one embodiment of the present invention.

SUMMARY OF THE INVENTION

In view of the above situation, an object of the present invention is to provide a music playing game apparatus and a performance guiding image display method which can engender a harmonic atmosphere of concert by giving instructions of operations to game players playing different kinds of simulated musical instruments, and a readable storage medium storing a performance guiding image forming program.

To fulfill the above object, according to the present invention, a music playing game apparatus comprises: background music reproducing means for reproducing a background music chosen from a plurality of background music stored in a storage medium; display means for displaying an image stored in the storage medium; control means for reading a plurality of simulated music instruments to be played by a player and a content of recorded information in the storage medium and for executing a predetermined operation to the display means and the background music reproducing means upon receiving an operation signal from the simulated music instrument. Said control means includes a pattern storage unit for storing operation instruction pattern for instructing an operation with the simulated music instrument; a music playing sound information storage unit for storing playing sounds of the simulated music instrument so as to correspond to each operation instruction pattern; a display control unit for dividing the display area into sections whose number is in accordance with the number of the simulated music instruments, for reading out the operation instruction pattern corresponding to the background music to be reproduced, and for displaying the operation instruction patterns in synchronism with the reproduced music in divided sections respectively; and a playing sound output unit for reading out and outputting a playing sound from the playing sound information storage unit, the playing sound corresponding to the operation instruction signal at a time of operation of the music instrument in accordance with the operation instruction pattern displayed on the display control unit.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
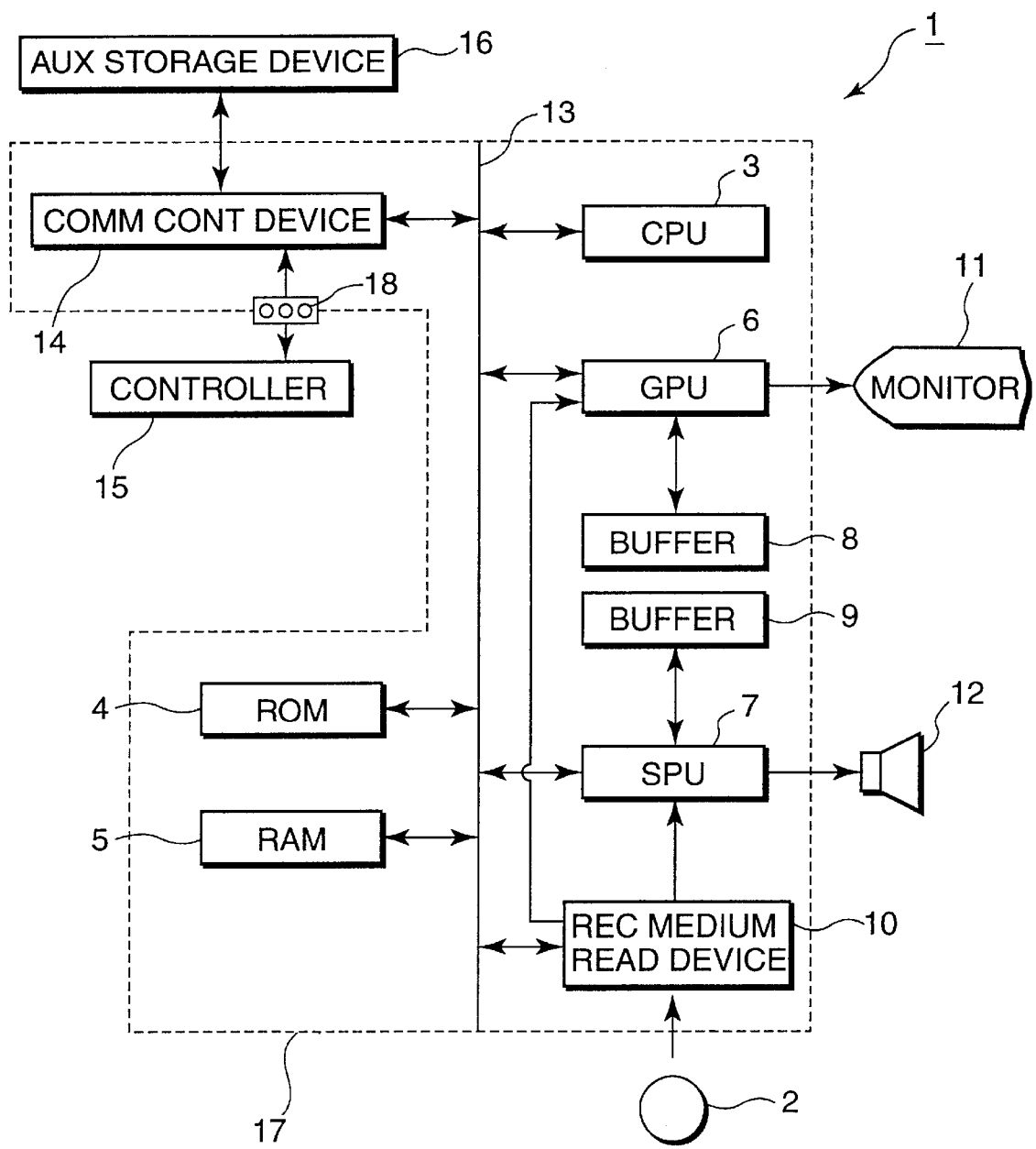
FIG. 1 is a control block diagram of a game system of a music playing game apparatus according to the invention.

FIG. 1 is a control block diagram of a game system 1 for home use according to the invention. In this game system 1, specified games are played in accordance with a game program stored in a storage medium 2.

The game system 1 is provided with a CPU 3 for centrally controlling the operation of a game apparatus, a ROM 4 and a RAM 5 as a main storage for the CPU 3, a graphics processing unit (hereinafter, "GPU") 6 and a sound processing unit (hereinafter, "SPU") 7 for image processing and sound processing, respectively, buffers 8, 9 for the respective units 6 and 7, and a storage medium reader 10. An operating system as a program necessary for the operation control of the entire game apparatus is written in the ROM 4. The game program and data read from the storage medium 2 are written in the RAM 5 if necessary. The game program, screen data and sound data necessary for games and like data are stored in the storage medium 2. A CD-ROM, magnetic disk, optical disk, DVD or the like can be adopted as the storage medium 2.

The storage medium reader 10 reads the program and the data stored in the storage medium 2 in accordance with instructions given from the CPU 3 and temporarily save the read contents in the RAM 5 and the buffer 9. The GPU 6 forms a game screen on the buffer 8 upon receipt of an image data from the storage medium 2, and synchronously outputs a data of the formed image to a monitor 11 after converting it into a specified video reproduction signal. The SPU 7 reproduces sound data, music data, sound source data and like data read from the storage medium 2 and saved in the buffer 9 and outputs the reproduced data via a loudspeaker 12. Generally, a home television receiver is used as the monitor 11, and a loudspeaker built in the home television receiver is used as the loudspeaker 12.

A communication control device 14 is connected with the CPU 3 via a bus 13, and a controller 15 and an auxiliary storage device 16 are detachably connected with the device 14. The controller 15 functions as an input device provided with an operable member for receiving various operations made by a game player. The communication control device 14 scans an operated result of the controller 15, i.e. an operated state of the operable member by the game player in a specified cycle of, e.g. 1/60 sec. to temporarily save it in the auxiliary storage device 16, and outputs the saved content to the PCU 3 in synchronism with the scanning cycle. The CPU 3 recognizes the operated state of the controller 15 in accordance with a signal of the communication control device 14. It should be noted that a plurality of controllers 15 and a plurality of auxiliary storage devices 16 can be connected in parallel with the communication control device 14.

In the above construction, the elements other than the storage medium 2, the monitor 11, the loudspeaker 12, the controller 15 and the auxiliary storage medium 16 construct a main game unit 17 by being integrally accommodated in a specified housing. An adapter 18 having a plurality of connection ports, i.e. three connection ports in this embodiment is provided in a specified position on the outer surface of the main game unit 17. A maximum of three controllers 15 are connectable with the main game unit 17 via the adapter 18.

In this embodiment, the stored contents of the storage medium 2 to be set in the storage medium reader 10 are music playing games by a simulated drum set and a simulated guitar as described later. Hereinafter, this game apparatus is described.

The controllers 15 include a drum controller (hereinafter, "simulated drum set") and a guitar controller (hereinafter, "simulated guitar") specially provided for the music playing game, and a general-purpose controller provided for the main game unit 17 for general purposes.

A case where the special controllers (simulated drum set and simulated guitar) are connected with the adapter 18 is described below. It should be noted that the general-purpose controller may be used as a controller of the music game apparatus.

Figure 2:
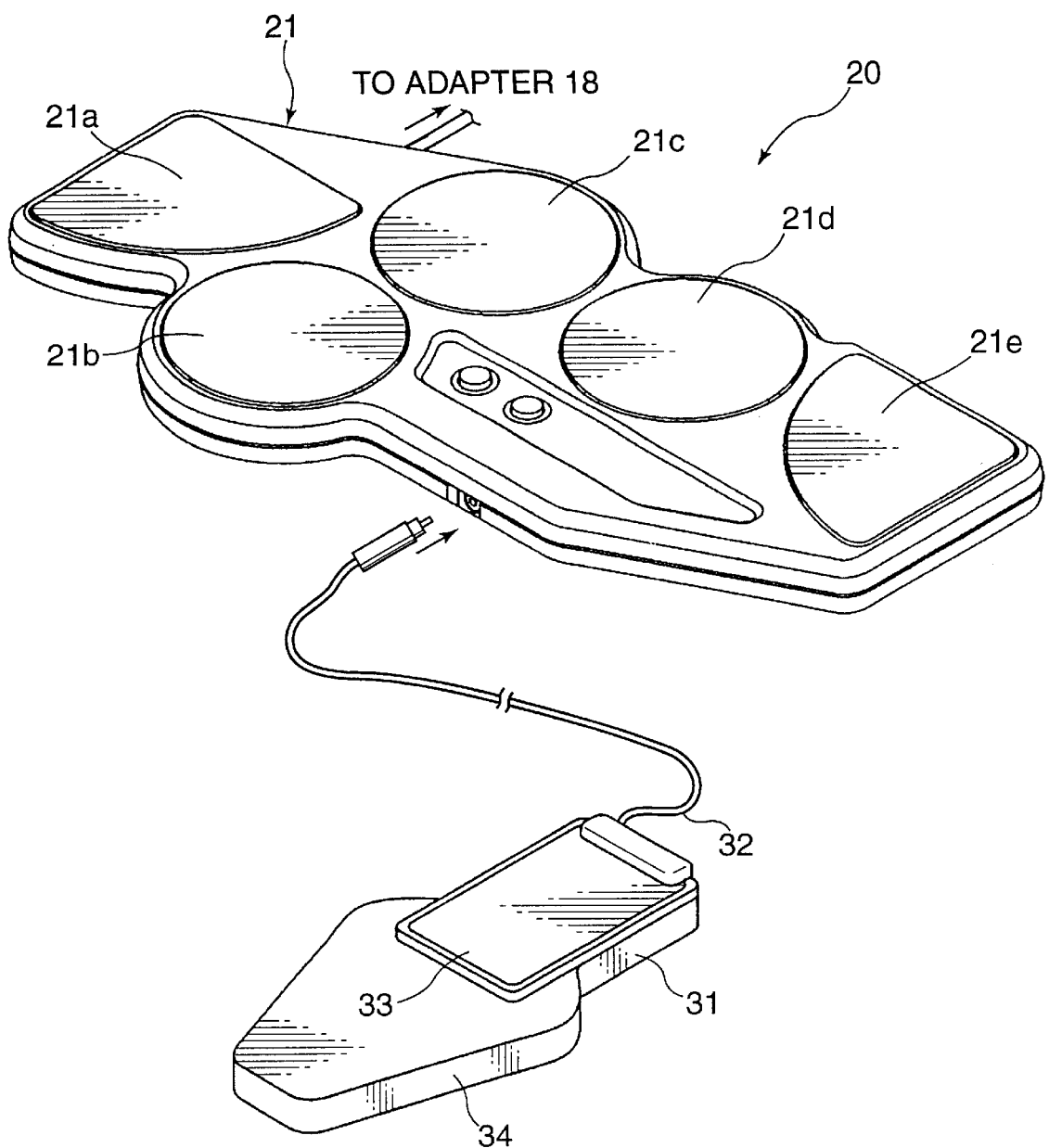
FIG. 2 is a perspective view entirely showing a simulated drum set.
Figure 3:
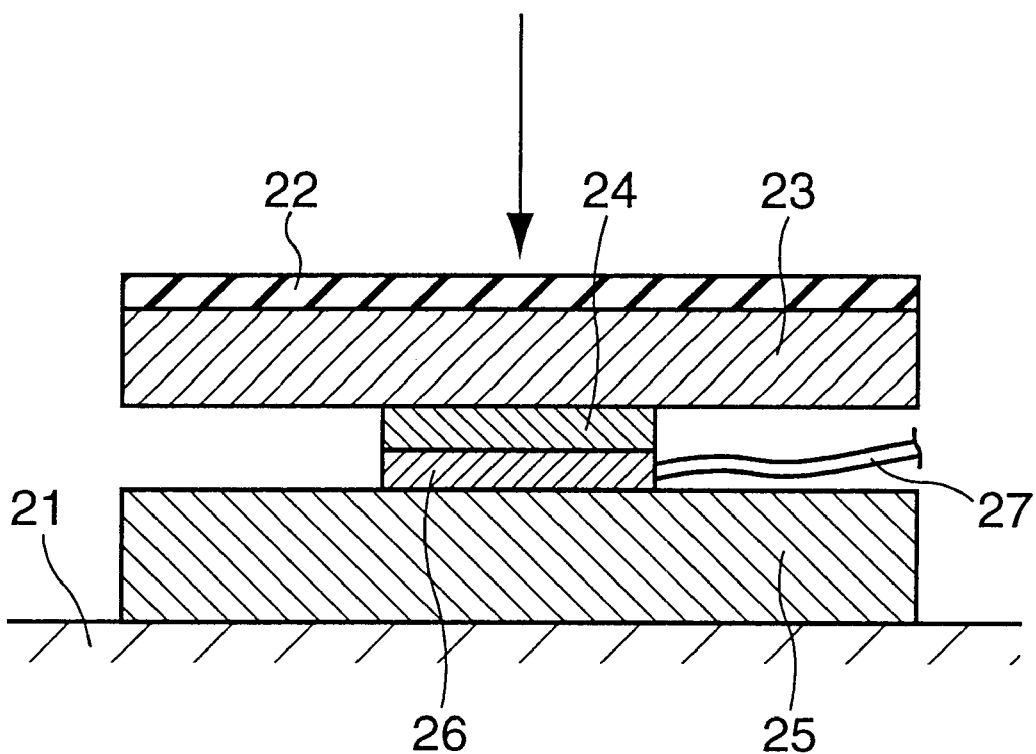
FIG. 3 is a section showing a pad portion.

FIG. 2 is a perspective view showing the external configuration of the simulated drum set 20, and FIG. 3 is a section thereof. As shown in FIGS. 2 and 3, the simulated drum set 20 includes a main drum unit 21 in which drum pads 21a, 21b, 21c, 21d, 21e simulating percussion instruments such as drums and cymbals are arranged in a specified manner, and a foot pedal 31 connected with the main drum unit 21 via a cable 32 and simulating a foot pedal used for a percussion instrument such as a base drum. The upper surfaces of the drum pads 21a to 21e can be hit by drum sticks and the foot pedal 31 can be stepped on by foot.

As shown in FIG. 3, each of the drum pads 21a to 21e has a pad portion 22 directly hit by the stick, and a vibration transmitting plate 23 made of a resin for absorbing a vibration created in the hit pad portion 22 up to a specified level. Each of the drum pads 21a to 21e is adhered to a plate-shaped piezoelectric device 26 as a detection means provided on a base 25 of the main drum unit 21 via an adhesive double coated member 24 made of a foamed material. A cable 27 for receiving the vibration of the piezoelectric device 26 in the form of a signal is attached to the piezoelectric device 26. Thus, the vibration of the pad portion 22 hit by the stick is sent as an input signal to the main game unit 17 via the vibration transmitting plate 23, the adhesive double coated member 24, the piezoelectric device 26 and the cable 27.

The foot pedal 31 has a pedal portion 33 made of a soft material and a base portion 34 for fixedly supporting the pedal portion 33. A step detecting switch (not shown) for detecting a stepped state of the pedal portion 33 by the game player is built in the pedal portion 33, and a step detection signal detected by the step detecting switch is sent to the main game unit 17. The step detecting switch may be, for example, comprised of two electrode plates having a specified potential difference, and an elastic plate provided between the two electrode plates and having a plurality of holes. When the pedal portion 33 is stepped on, a current flows at any of the holes by the contact of the two electrode plates, and the step detecting switch detects this current.

The cable 32 is relatively long, so that the main drum unit 21 and the foot pedal 31 can be arranged at different heights.

Figure 4:
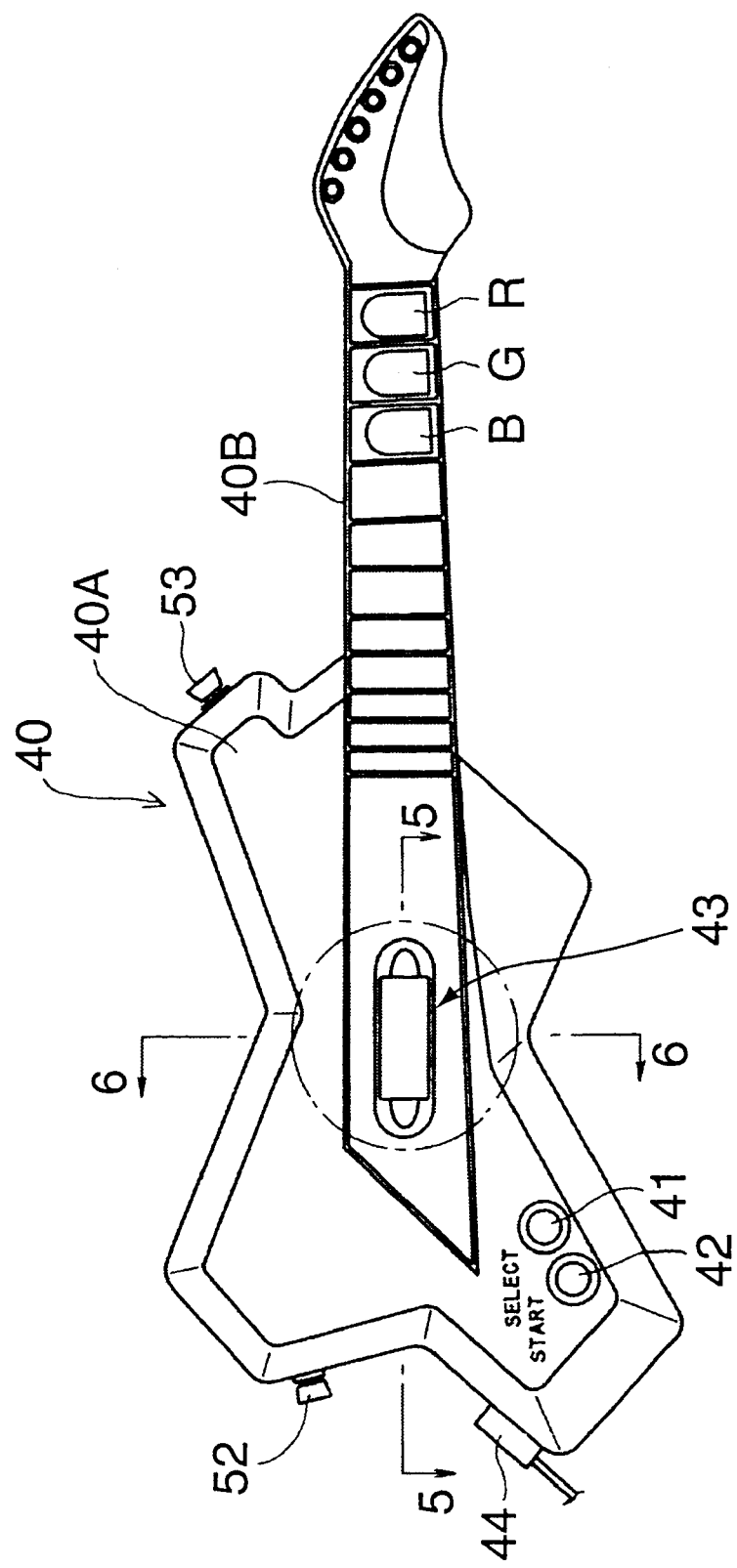
FIG. 4 is a diagram entirely showing a simulated guitar.

FIG. 4 is a perspective view showing the external configuration of the simulated guitar 40. The simulated guitar 40 includes three neck buttons R, G, B as rhythmic sound selecting means for selecting a kind of rhythmic sound for each sound along the flow of the music with time from a plurality of rhythmic sounds of the music, and a picking input means 43 as an output timing determining means for determining an output timing of a sound production instructing signal by selectively operating at least one of the neck buttons R, G, B, a select switch 41 provided below the picking input means 43 for switching additional modes including an echo mode for outputting substantially the same kind of sounds so as to echo and a chorus mode for substantially simultaneously outputting different kinds of sounds, and a start switch 42 for starting a music performance. The neck buttons R, G, B are an input means for left hand for guitar codes, and the picking input means 43 is an input means for right hand for inputting guitar picking. These input means for left and right hands may be reversed.

Figure 5:
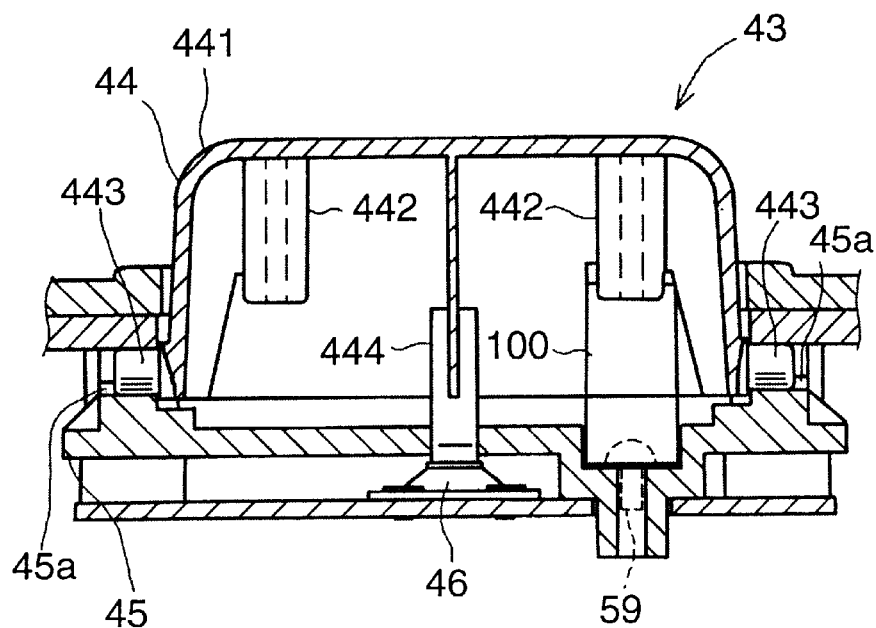
FIG. 5 is a section along 5—5 of FIG. 4.
Figure 6:
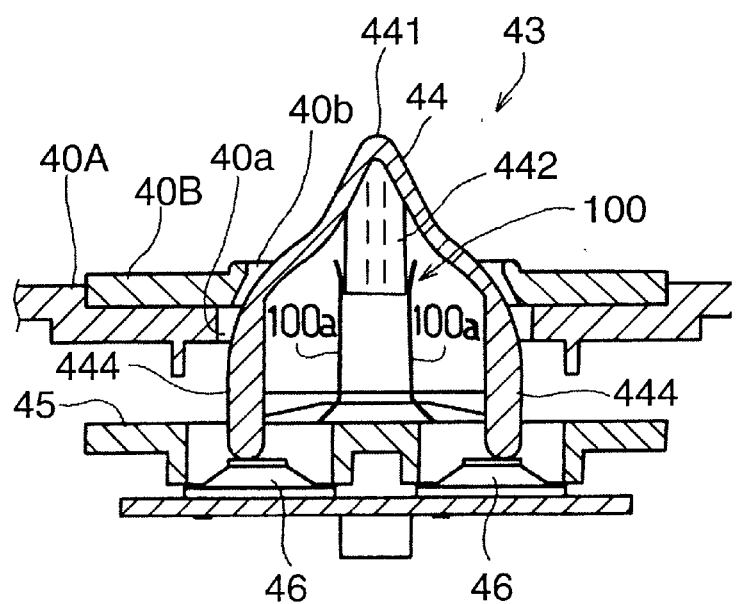
FIG. 6 is a section along 6—6 of FIG. 4.

As shown in FIGS. 5 and 6, the picking input means 43 includes a picking blade 44, an elastically holding member 100 for rotatably supporting the picking blade 44, and rotation detecting means 46 provided at the opposite sides of a bottom portion of the picking blade 44 for detecting the rotation of the picking blade 44. The simulated guitar 40 is comprised of a main unit 40A, a neck unit 40B provided with the neck buttons R, G, B, and a rear side, which are so arranged that an opening 40a formed in the main unit 40A substantially coincides with an opening 40b formed in the neck unit 40B.

The picking blade 44 has a triangular cross section having an open bottom, and includes a top portion 441, two projections 442 having a fixed thickness and projecting downward from two positions on the inner surface of the top portion 441, two shaft portions 443 having a circular cross section and projecting outward from the opposite side surfaces of the picking blade 44, and two pushing portions 444 formed by thickening the walls of the picking blade 44 substantially at the longitudinal center of its inner surface from substantially the middle positions with respect to height direction to the bottom end. The respective pushing portions 444 act to push the rotation detecting means 46 located in a rotating direction by the rotation of the picking blade 44.

The shaft portions 443 are rotatably supported on recess-shaped shaft bearings 45a provided in mount members 45 coupled to the main unit 40A via screws 59 to be described later. In this supported state, the top portion 441 projects out through the openings 40a, 40b.

One of the two projections 442 having a fixed thickness is supported by the substantially U-shaped elastically holding member 100 which is mounted on the mount member 45 via the screw 59. The two projections 442 are symmetrically arranged with respect to the longitudinal direction of the picking blade 44.

The elastically holding member 100 is formed of a spring member and has two holding portions 100a, between which the projection 442 is inserted. Thus, when the picking blade 44 is picked to rotate, the projection 442 having a fixed thickness is inclined to thereby widen a spacing between the two holding portions 100a and, conversely, the two holding portions 100a try to narrow the spacing. This causes the picking blade 44 to return to its original reference position.

In the picking input means 43 thus constructed, when the picking blade 44 is picked in one of the rotating directions, the pushing portion 444 at the side of this rotating direction pushes the corresponding rotation detecting means 46. The rotation detecting means 46 outputs a sound production instructing signal representing a sound production instructing timing upon the lapse of a predetermined time after being pushed. Such a time lag is designed to make the guitar playing more realistic by approximating sound production to the one obtained when guitar strings would be actually picked. When the aforementioned picking is performed, the projection 442 having a fixed thickness is inclined to widen the spacing between the two holding portions 100a, and the two holding portions 100a conversely try to narrow the spacing. Accordingly, the picking blade 44 is returned to its reference position. The above applies to a case where the picking blade 44 is rotated in the other rotating direction although the other rotation detecting means 46 is involved here.

This construction has an advantage of very easy assembling of not only the picking input means 43, but also the simulated guitar 40 since the picking blade 44 can be supported only by inserting the projection 442 between the two holding portions 100a.

The neck buttons R, G, B provided on the front surface of the neck unit 42 are so constructed as to be pressable while being biased to project outward. A mechanical switch or the like for detecting that the button has been pressed is provided inside each of the neck buttons R, G, B. Thus, the operation of the corresponding neck button by pressing can be detected.

Figure 7:
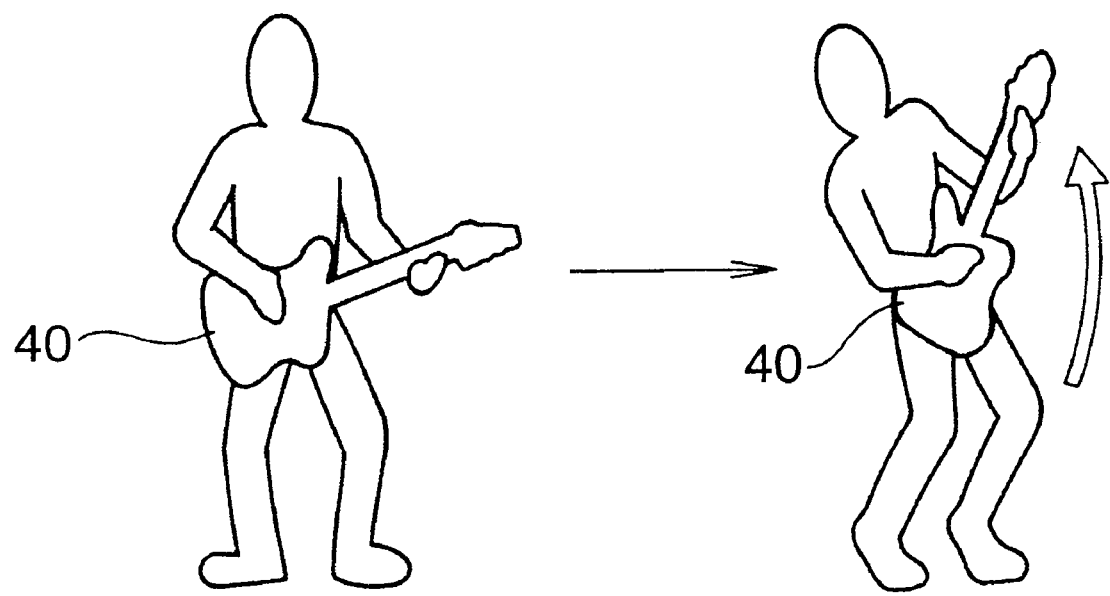
FIG. 7 is a diagram showing an act of wailing.

In a specified position inside the simulated guitar 40 is provided an unillustrated orientation detecting means for detecting that the simulated guitar 40 has been turned upward (hereinafter, "wailing operation") as shown in FIG. 7. An inclination sensor taking advantage of gravity, an acceleration sensor for detecting a change of orientation to an upright position or like sensor may be adopted as the orientation detecting means.

In this embodiment, a case where a picking operation is performed while a fret maneuvering operation is performed is processed as a valid operation as described later. Further, in the case of an erroneous fret maneuvering operation (including no fret maneuvering operation), other sounds (e.g. sounds prepared for erroneous operations may be outputted.

Figure 8:
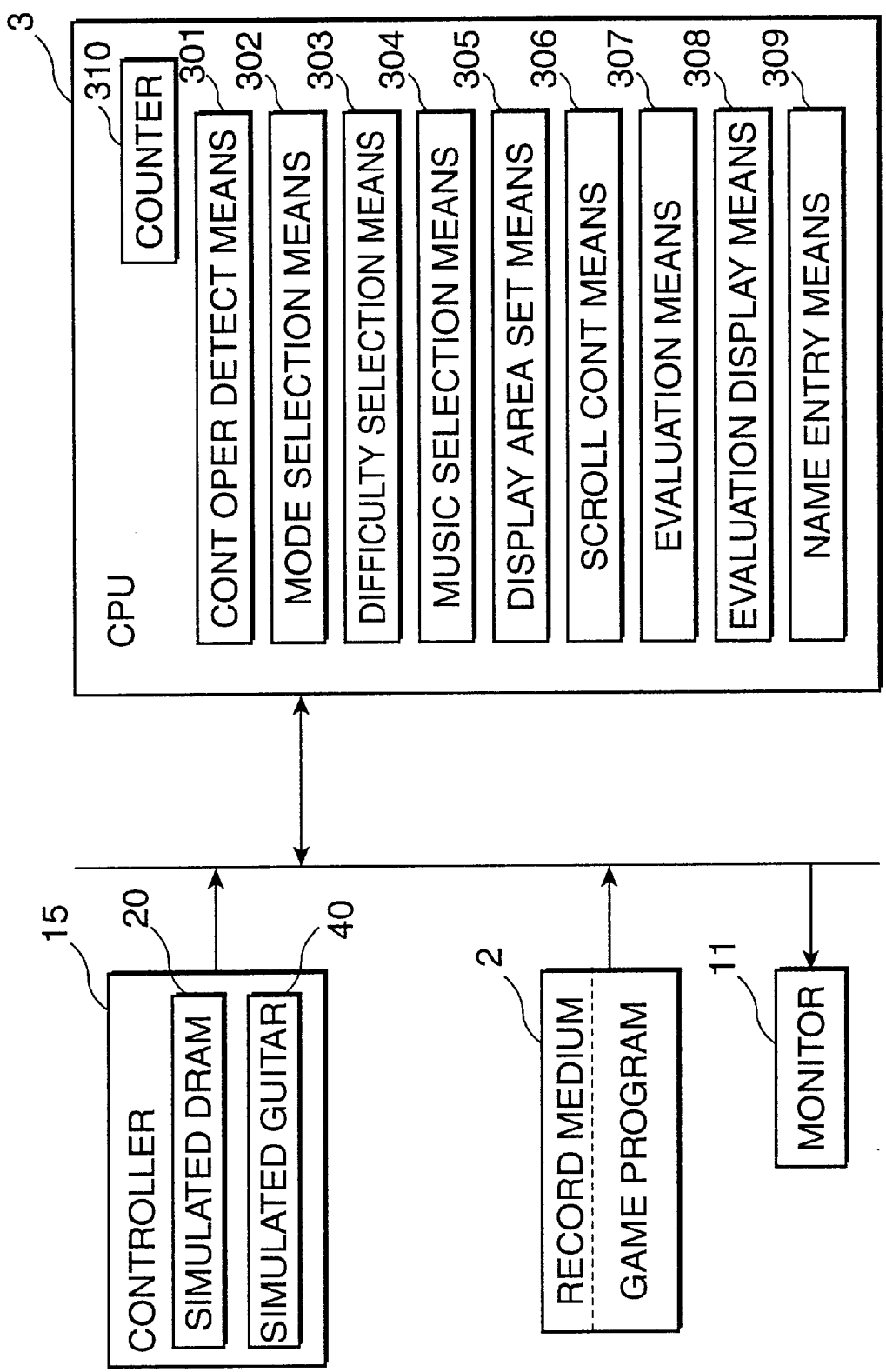
FIG. 8 is a block diagram showing a function block of a CPU and an essential portion of FIG. 1.

FIG. 8 is a block diagram showing a function block of a CPU and an essential portion of FIG. 1.

The CPU 3 is provided, as function blocks, with a controller detecting means 301, a mode selecting means 302, a degree of difficulty selecting means 303, a music number selecting/setting means 304, a display area setting means 305, a scroll control means 306, an evaluating means 307, an estimation display means 308 and a name entry enabling means 309.

The controller detecting means 301 detects various operations of the respective simulated musical instruments 20, 40 in accordance with operation signals outputted from the simulated drum set 20 and the simulated guitar 40.

The mode selecting means 302 causes a mode selection screen to be displayed on the display screen of the monitor 11 in order to let the game player to select a mode from a drum playing mode in which only the simulated drum set 20 is played, a first session mode in which the simulated drum set 20 and one simulated guitar 40 are played, and a second session mode in which the simulated drum set 20 and two simulated guitars 40 are played, and sets the selected mode for the music playing to be played.

The degree of difficulty selecting means 303 causes a degree of difficulty selection screen to be displayed on the display screen of the monitor 11 in order to let the game player select a degree of difficulty of the game set only for the drum playing mode from beginner, intermediate and advanced levels, and sets the selected degree of difficulty for the music playing game to be played.

The music number selecting/setting means 304 causes a music number selection screen in which selectable music numbers are listed to be displayed on the display screen of the monitor 11, and sets the music number selected by the game player as a background music of the music playing game.

The display area setting means 305 divides a display area of the display screen of the monitor 11 according to the number of the game players, and sets the divided areas as areas for displaying indicators as operation instructing portions for the respective simulated musical instruments to be operated.

The scroll control means 306 causes operation contents specified by performance data to be described later to be scroll-displayed as note bars in the indicators at a specified speed.

The evaluating means 307 distributes gauges to the game player(s) according to the selected mode, calculates degrees of coincidence based on correlation between timings of the respective instructions of operations displayed on the display screen of the monitor 11 and timings at which the simulated musical instrument(s) was(were) actually operated, adds the calculated degrees of coincidence as a score, and diagnoses the exactness of the successive operations.

The estimation display means 308 causes the contents of estimation by the evaluating means 307 to be displayed on the display screen in the form of words such as "Perfect!", "Cool", "Good", and "Bad" expressing the estimation of each operation, and causes a word representing how many operations each game player has continuously performed without any error to be displayed on the display screen as described later. The estimation display means 308 also causes the estimation results to be successively reflected on a level gauge, i.e. increases and decreases the level gauge.

The name entry enabling means 309 causes a name entry screen for recording the names of the game players to be displayed on the display screen of the monitor 11, and saves contents inputted using the name entry screen.

An inner counter 310 measures a time lapsing after a moment when the level gauge becomes 0.

Figure 9:
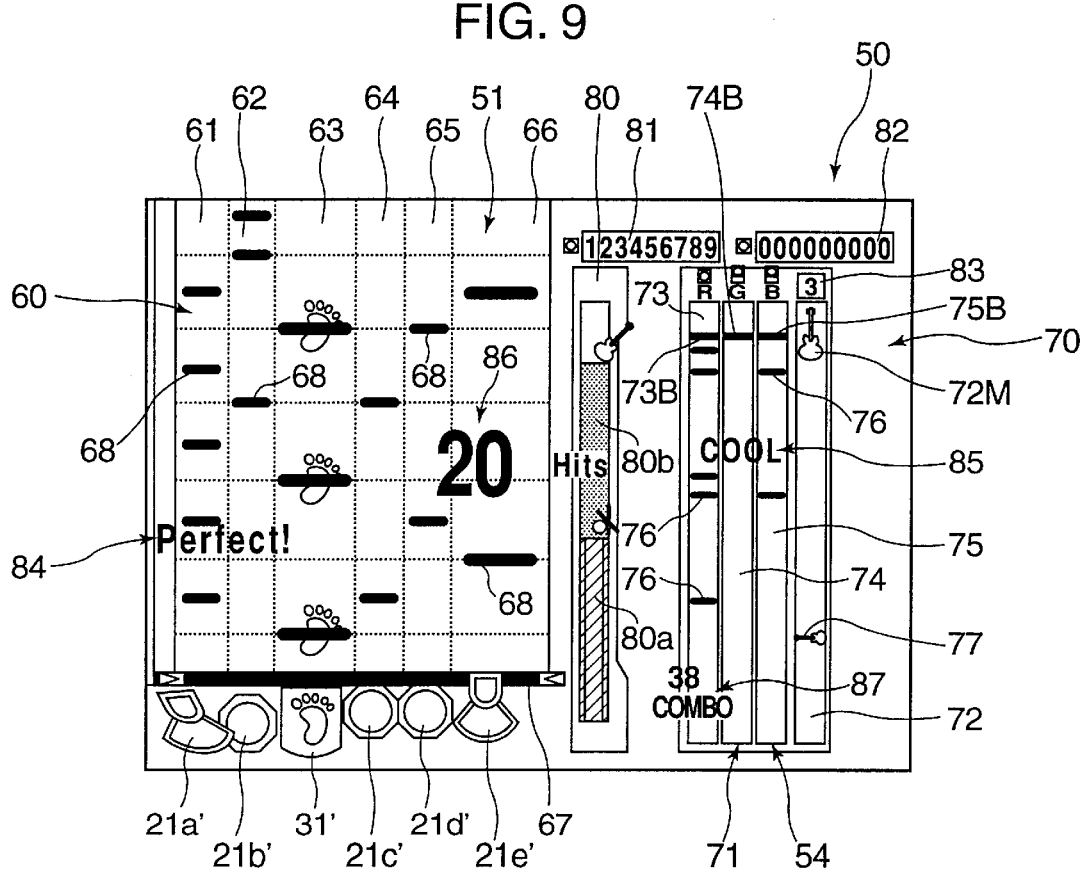
FIG. 9 is a diagram showing a game screen.

FIG. 9 shows a basic screen of the music playing game executed in accordance with the program stored in the storage medium 2. The display area setting means 305 causes a drum indicator 60 to be displayed in a left area 51 of the game screen 50 in order to instruct the game player to operate the simulated drum set 20, causes a guitar indicator 70 to be displayed in a right area 52 of the game screen 50 to instruct the game player to operate the simulated guitar 40, and causes a level gauge 80 for indicating the estimation for the game player(s) in real time to be displayed in an area 53 between the areas 51 and 52.

In the drum indicator 60, vertically long tracks 61 to 66 for instructing operations of hitting the drum pads 21*a* to 21*e* of the simulated drum set 20 and an operation of stepping the foot pedal 31 are transversely arranged next to each other, and marks 21*a*' to 21*e*', 31' simulating the drum pads 21*a* to 21*e* and the foot pedal 31 are displayed below the respective tracks 61 to 66. A reference bar 67 is fixedly displayed at the bottom ends of the respective tracks 61 to 66, and note bars 68 which move down at a specified speed from the upper end to the bottom end (scroll display) are displayed on the respective tracks 61 to 66. The note bars 68 are scrolled to instruct the game player to operate the simulated drum set 20 at timings when they overlap the reference bar 67.

The guitar indicator includes an area 71 for instructing the fret maneuvering operation by means of the neck buttons R, G, B, and a track 72 for indicating the wailing operation. In the area 71, vertically long tracks 73 to 75 corresponding to the neck buttons R, G, B of the simulated guitar 40 are transversely arranged next to each other. Reference bars 73B, 74B, 75B are fixedly displayed near the upper ends of the respective tracks 73 to 75, whereas a reference mark 72M simulating the shape of the guitar is fixedly displayed near the upper end of the track 72. Note bars 76, 77 which move up from the bottom end to the upper end of the guitar indicator 70 (scroll-displayed) are displayed on the respective tracks 72 to 75. In order to make a correspondence between the tracks 73 to 75 and the neck buttons R, G, B easily distinguishable, characters R (first letter of RED), G (first letter of GREEN) and B (first letter of BLUE) are displayed near the upper ends of the tracks 73 to 75, and the reference bars 73B, 74B, 75B are displayed in red, green and blue, respectively. Similar to the drum indicator 60, the note bars 76, 77 are scrolled to instruct the game player to perform the fret maneuvering operation or the wailing operation at timings when they overlap the reference bars 73B, 74B, 75B or the reference bar 72M.

The level gauge 80 is divided into a drum gauge 80*a* and a guitar gauge 80*b* (further into a guitar gauge 80*c* (see FIG. 10) in the case that two game players play the simulated guitars 40). In the session mode, the evaluating means 307 equally allots the gauges 80*a*, 80*b* to the respective game players at the start of the game, individually evaluates their levels after the start of the game to increase and decrease quantities given to the respective game players, and makes an estimation based on a collective responsibility such that, when one game player loses his given quantity, that of the other game player is decreased. The estimation display means 308 displays the estimation result of the evaluating means 307 on the gauge 80.

At an upper part of the area 71 are provided score display sections 81, 82 for displaying scores of the respective game players which are calculated based on the judgment results on the operation timings made by the evaluating means 307. The score display section 81 displays a total score at the drum playing tracks 61 to 66, whereas the score display section 82 displays a total score at the guitar playing tracks 72 to 75. Above the track 72 is provided a display section 83 for displaying the type of the modes such as the aforementioned echo mode and chorus mode.

Displays "20Hits" and "38COMB0" indicate how many operations the respective game players have performed without mistakes as described above.

For example, if the game is started in the session mode, the background music is reproduced, and the note bars 68, 76 successively appear at specified timings and are scrolled in the specified directions at the respective indicators 60, 70. When the respective note bars 68, 76 overlap the reference bars 67, 73B to 75B, the picking blade 44 is operated while pressing the neck buttons corresponding to the areas the note bars belong to. Then, sound effects allotted to the note bars are outputted together with the background music. An applause, cheers and mimicking sounds, etc. of the audience are outputted if the game player performs a wailing operation when the note bar 77 overlaps the reference mark 72M.

FIG. 9 shows a game screen in the first session mode where one game player operates the simulated drum set 20 and one game player operates the simulated guitar 40. When the drum playing mode in which only the simulated drum set 20 is operated is selected, only the drum indicator 60 is displayed on the entire game screen without displaying the guitar indicator 70. Animated images (see FIG. 15) or the like are displayed in a position where the guitar indicator 70 would otherwise be displayed.

Figure 10:
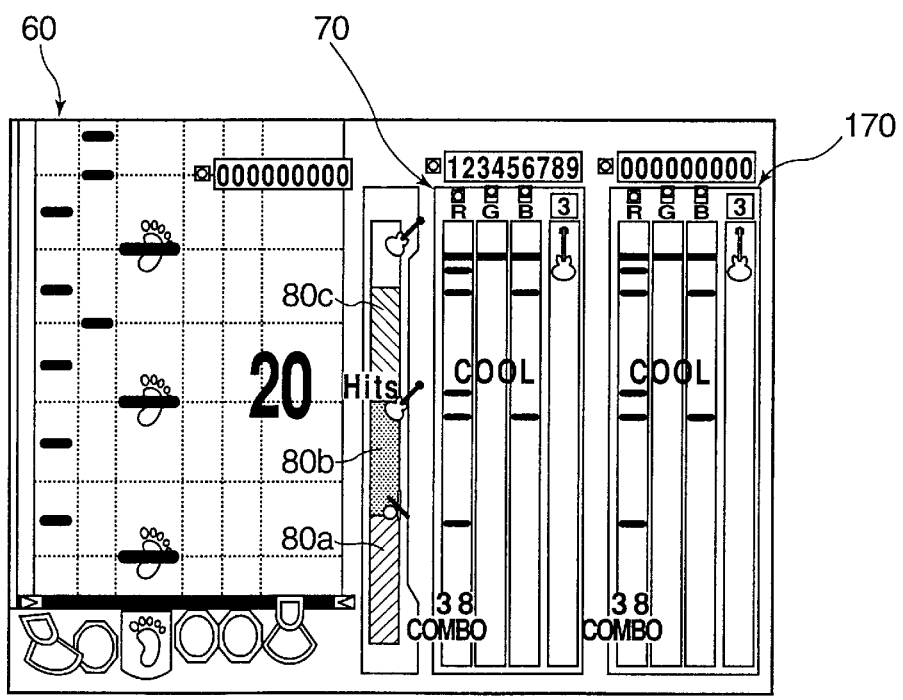
FIG. 10 is a diagram showing another game screen.

FIG. 10 shows a game screen in the second session mode where one game player operates the simulated drum set 20 and two game players operate the simulated guitars 40. As shown in FIG. 10, the guitar indicator 70 of FIG. 9 and a guitar indicator 170 for the third game player are juxtaposed in the area 52. In this case, the respective tracks 61 to 66 are narrower, i.e. the indicator 60 is narrower, and the position of the indicator 70 is shifted more toward the indicator 60 as compared to the game screen of FIG. 9.

Figure 11:
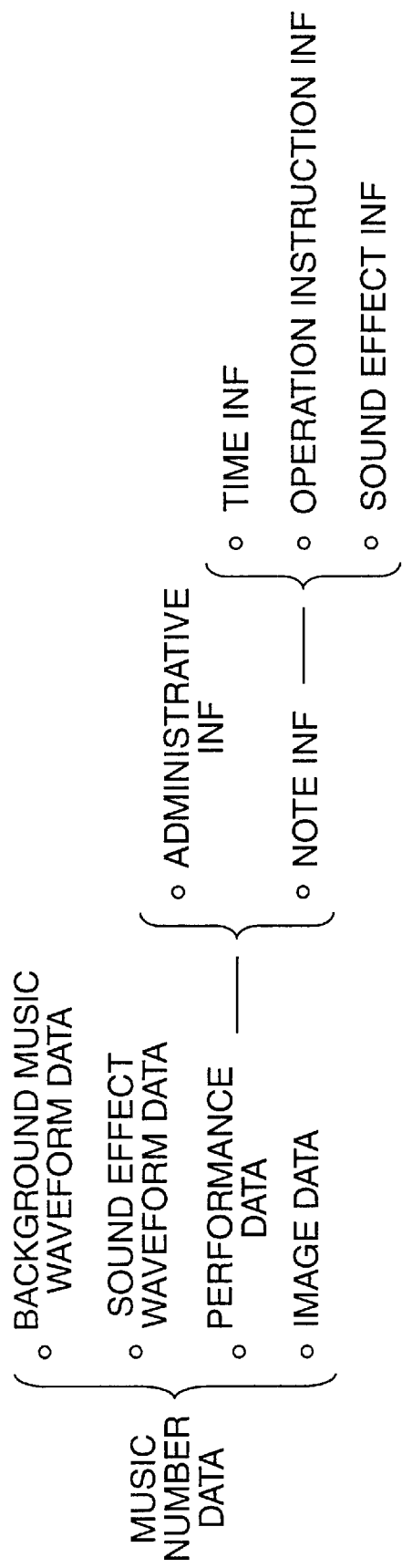
FIG. 11 is a diagram showing configuration of music data stored in a storage medium.

FIG. 11 shows an outline of a data of one music number (hereinafter, music number data) stored in the storage medium 2. In the storage medium 2, a plurality of music numbers are stored as background music used in the music playing game, and the data shown in FIG. 11 generated for each music number are stored.

As shown in FIG. 11, the music number data is comprised of background music waveform data, sound effect waveform data, performance data and image data. The background music waveform data are data defining waveforms for reproducing the music number. In this embodiment, a background music waveform data from which only drum sounds are extracted, the one from which drum and guitar sounds are extracted (for two game players), and the one from which sounds of the drum set, the first and second guitars are extracted (for three game players) are prepared for each music number. When the drum playing mode is selected by the mode selecting means 302, the background music data from which only the drum sounds are extracted is used. When the session mode is selected, the background music data from which the drum and guitar sounds are extracted is used. The sound effect waveform data is a data defining waveforms of various sound effects. The background music waveform data and the sound effect waveform data are stored in the storage medium 2 in the form of, e.g. PCM data and ADPCM data. Although three types of background music waveform data corresponding to the modes to be selected are prepared in this embodiment as described above, only the background music waveform data from which the sounds of the drum set, the first and second guitars are extracted (for three game players) may be prepared. When, for example, the first session mode is selected, the second guitar may be automatically played in addition to the background music based on the background music waveform data.

Peculiar administration codes are affixed to the background music waveform data and the sound effect waveform data, and are stored in the storage medium 2 in a table format in correspondence with stored positions of the waveform data (hereinafter, "sectors"). Not only the sound effect waveform data corresponding to the note bars 68, 76, but also sound effect waveform data corresponding to the note bars 77 for the aforementioned wailing operation are stored with administration codes.

The performance data are data specifying contents of operations instructed to the game players via the drum indicator 60 and the guitar indicator 70 and allotments of sound effects to be reproduced in correspondence with the respective operations. The image data are data necessary to display the game screen 50. Similar to the background music waveform data, two kinds of the performance data and the image data, i.e. for the drum playing mode and the session mode are prepared.

Each performance data is comprised of administrative informations and note informations. The administrative informations include the administration codes of the background music waveform data, the number of the note bars, etc. The administrative informations also include an information for identifying whether the performance data is for the drum playing mode or for the session mode.

The note information is an information relating to the individual operations instructed by the note bars of the respective indicators 60, 70. In other words, the note information is an information relating to the operations instructed by the individual note bars in an order along a time axis such that, for example, a first note information concerns an operation to be performed first after the start of performance of the background music, and a second note information concerns an operation to be performed second.

Each note information is comprised of a time information, an operation designating information and a sound effect information. The time information is an information for designating a timing of operation designated by the operation designating information by a lapse of time from the start of performance of the background music. The operation designating information is an information for designating a content of operation performed at the timing designated by the time information. For example, in the case of designating the fret maneuvering operation by means of the neck button R and the picking operation in X min. Y sec. after the start of the performance, a timing of the picking operation, i.e. X min. Y sec. is designated by the time information, and the neck button R is designated by the operation designating information. The same applies to a case where the wailing operation is designated. It should be noted that the time information may directly designate a lapse of time after the start of the performance or may designate an information correlating with a lapse of time of the sector numbers of the storage medium 2 or the like. The operation designating information may designate two or more operations. In such a case, a plurality of note bars are displayed side by side at the same level of the drum indicator 60 or the guitar indicator 70.

The sound effect information is an information for designating the administration code of the sound effect waveform to be reproduced for the operation designated by the operation designating information.

Figure 12:
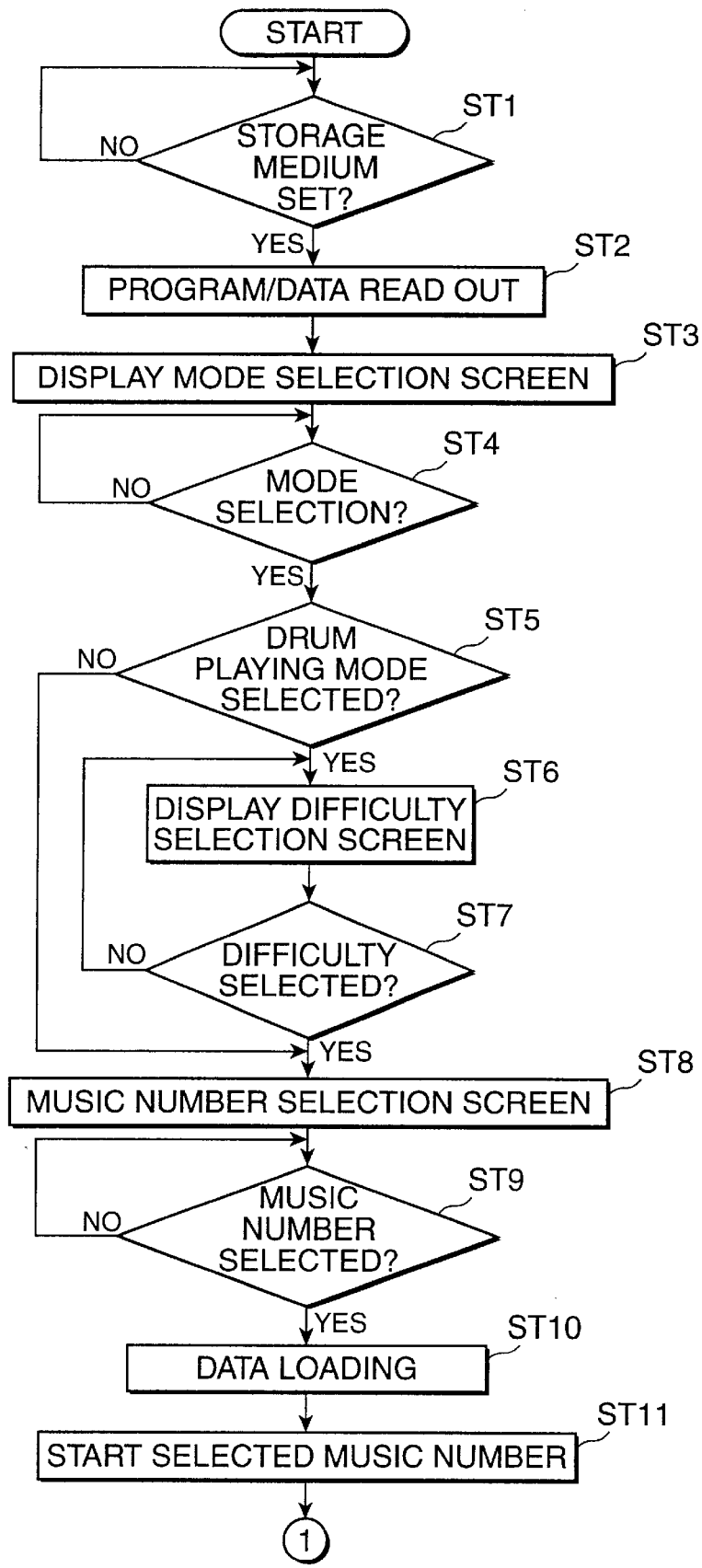
FIGS. 12 to 14 are a flow chart showing an operation procedure of the game system.
Figure 13:
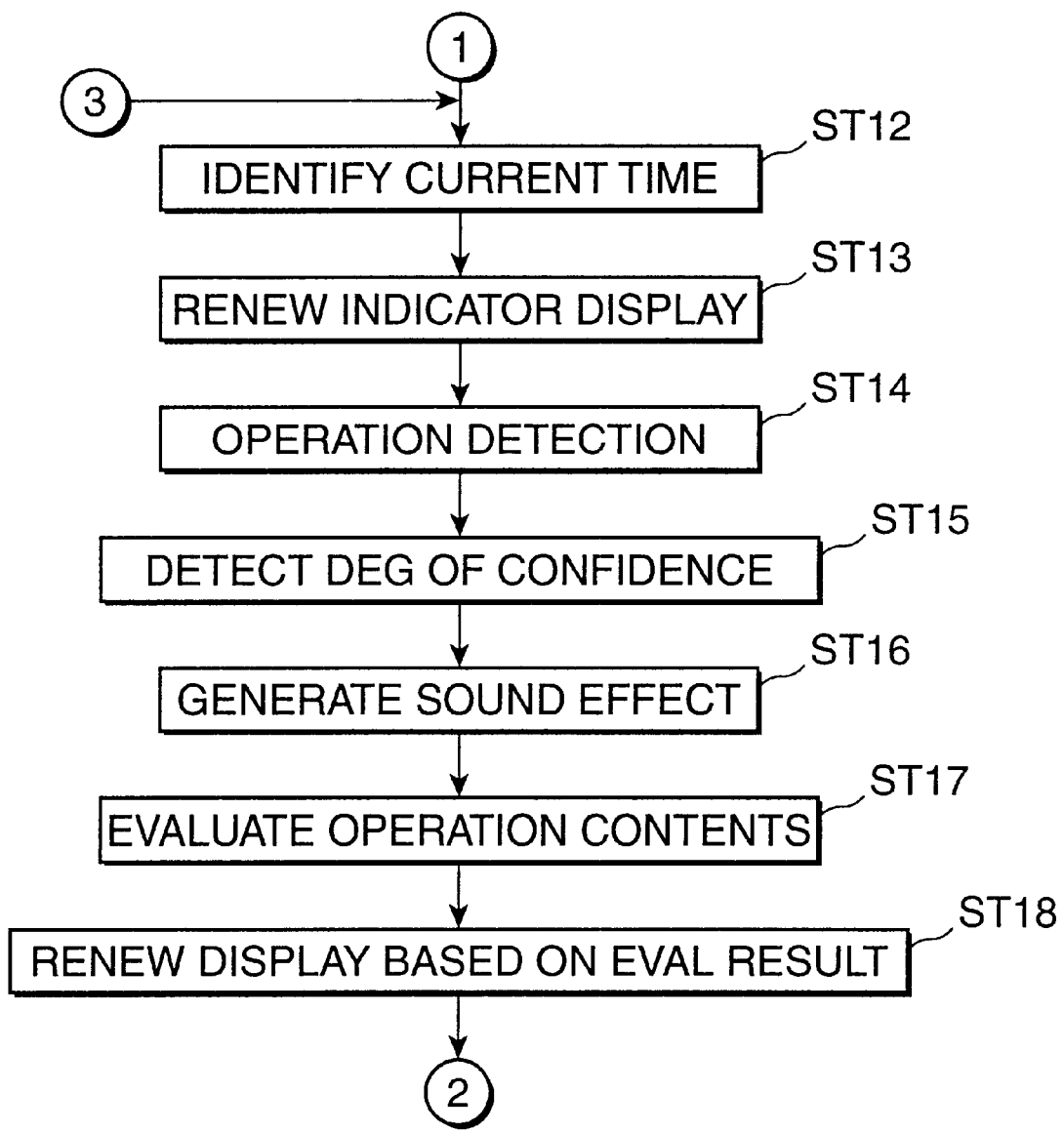
Figure 14:
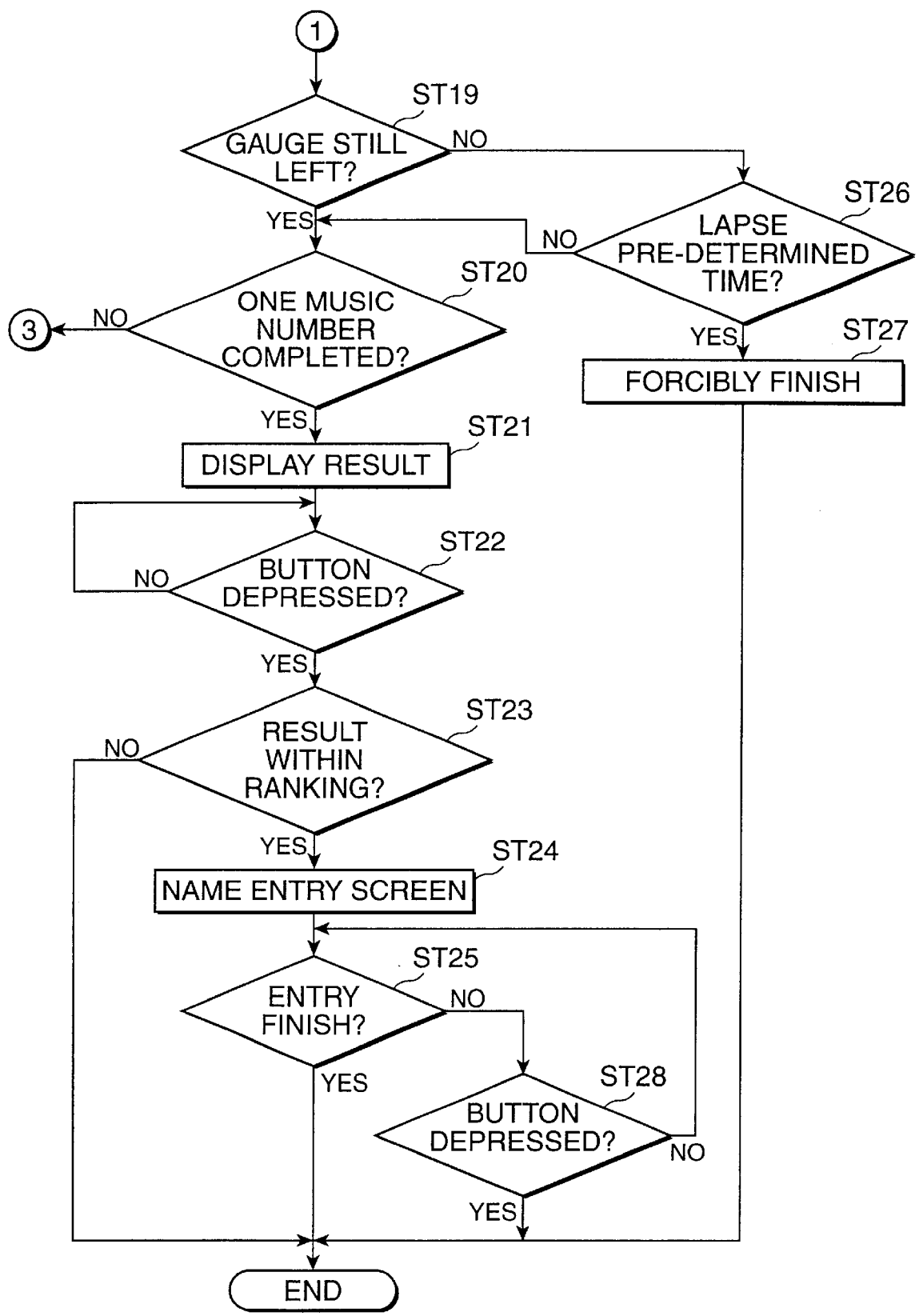

FIGS. 12 to 14 are a flow chart showing an operation procedure of game processing executed by the CPU 3 in accordance with the program stored in the storage medium 2.

First, when the storage medium 2 is set in the main game unit 17 (Step ST1), necessary program and data are read from the storage medium 2 (Step ST2), and the mode selection screen is displayed on the display screen of the monitor 11 (Step ST3). On this mode selection screen, "drum only (drum playing mode)", "drum+guitar (first session mode)", "drum+guitar+guitar (second session mode)" and "exit" are displayed.

Subsequently, it is discriminated whether a desired mode has been selected from the above modes (Step ST4). If the selection has been made, it is discriminated whether the selected mode is the drum playing mode (Step ST5). If the selected mode is the drum playing mode, the display screen of the monitor 11 is switched to the degree of difficulty selection screen (Step ST6). On this degree of difficulty selection screen, "Practice (beginner level)", "normal (intermediate level)" and "real (advanced level)" are displayed from the lowest degree of difficulty to the highest.

It is then discriminated whether a desired degree of difficulty has been selected from a plurality of degrees of difficulty (Step ST7). If the degree of difficulty has been selected, the display screen of the monitor 11 is switched to the music number selection screen (Step ST8). Unless the drum playing mode is discriminated to have been selected in Step ST5, the music number selection screen is displayed on the monitor 11, assuming that the session mode of the simulated drum set 20 and the simulated guitar(s) 40 was selected. In other words, the degree of difficulty cannot be selected in the case of the session mode.

When the music number is selected (Step ST9), the data of the selected music number and the data used to execute the mode selected in Step ST4 are transferred from the storage medium 2 to the RAM 5 (Step ST10). Subsequently, the background music waveform data corresponding to the selected mode are reproduced, i.e. the performance of the selected music number is started (Step ST11).

Then, a lapse of time after the start of the performance is identified as a current time (Step ST12). Here, the lapse of time after the start of the performance is specified with reference to, for example, the sector number of the background music waveform data. Subsequently, the displays of the indicators 60, 70 are renewed based on the current time (Step St13). This processing is performed by extracting all the note informations contained in a specified display range (e.g. corresponding to two measures of the music number) including the current time with reference to the time information of the performance data, calculating display positions of the note bars corresponding to the respective note informations such that the current time corresponds to the reference bars 67, 73B to 75B and the reference mark 72M and a time to come in the farthest future within the display range corresponds to the upper end of the indicator 60 and the bottom end of the indicator 70, and displaying the respective note bars in the calculated display positions. By repeating this processing, the note bars corresponding to operations to be performed in a predetermined time from the present appear at the upper end of the indicator 60 and at the bottom end of the indicator 70, are gradually scrolled down in the indicator 60 and up in the indicator 70, and overlap the reference bars 67, 73B to 75B or the reference mark 72M when the time of operation comes.

After the displays of the indicators 60, 70 are renewed, the operation of the controllers 20, 40 within a predetermined time is detected (Step ST14), and a degree of coincidence between the detection data and the operation designated by the performance data is detected (Step ST15). For example, if the picking operation is detected while the fret maneuvering operation by means of the neck button R is detected, an information closest to the current time among the note informations for which the operation of the neck button R was designated by the operation designating information is conferred, and a time lag between a timing of the picking operation specified by the note information and a timing at which an actual picking operation was detected is detected. It should be noted that the detected fret maneuvering operation or picking operation is ignored in the case that one of the fret maneuvering operation and the picking operation is detected and the other thereof is not detected within such a time frame that this operation is conceived to have been performed simultaneously with the detected operation. In the case of detecting the wailing operation, a time lag between the time of detection and a time closest to the current time among times of the wailing operation defined by the performance data is detected. The degree of coincidence is also detected to be at the lowest level in the case that the operation defined by the performance data is not detected. If, for example, a hitting operation to the drum pad 21d should be detected, a time lag between the timing of the picking operation specified by the note information and the timing at which the actual picking operation was detected is detected similar to the above.

Next, the sound effect corresponding to the operation detected in Step ST14 is outputted (Step ST16). In this case, the sound effect waveform allotted to the operation having the highest degree of coincidence among the actually detected operations is designated and outputted.

After the reproduction of the sound effect, the operations of the game players are evaluated based on the degrees of coincidence detected in Step ST15 (Step ST17), and the quantity to be displayed in the level gauge 80 and the scores to be displayed in the score display sections 81, 82 are calculated based on the estimation result, and these displays are renewed (Step St18).

It is then discriminated whether the quantity is still left in the level gauge 80 (Step ST19). If the quantity is still left, it is discriminated whether a mode completion position has been reached, i.e. one music number has been completely played (Step ST20). This routine returns to Step ST12 unless the mode completion position has been reached yet. If no quantity is discriminated to be left in Step ST19, it is discriminated whether a predetermined time has been lapsed (Step ST26). The game is forcibly finished (Step ST27) if the predetermined time has been lapsed, while this routine proceeds to Step ST30 unless otherwise. In other words, the above processing is performed to give the game players an extension of time to continue the game if a suitable operation is performed within the predetermined time to increase the quantity in the level gauge 80 even though the quantity decreases to 0 once.

If one music number is discriminated to have been completely played in Step ST20, a result for one music number is calculated and displayed on the display screen of the monitor 11 (Step ST21). At this time, in the case of the session mode, the result of the drum player and that of the guitar player(s) are displayed in this order by operating the select button 41.

When the select button 41 is further operated (Step ST22), it is discriminated whether the above results lie within a specified ranking (Step ST23). If the discrimination result is affirmative, the display screen of the monitor 11 is switched to the name entry screen for inputting the name, result, etc. of the game player (Step ST24). The game ends when the input of the name and the like is completed (Step ST25). The game ends without displaying the name entry screen if the discrimination result in Step ST23 is negative. The music playing game ends without entering the result and the like if the start button is operated, i.e. the game player intentionally refuses to input his name and the like, before the input is completed in Step ST25.

As described above, the simulated drum set 20 and the simulated guitar(s) 40 are prepared, operation instructing patterns corresponding to the performance modes are prepared, the area of the display screen of the monitor 11 is divided and operation instructing patterns of the simulated musical instruments are displayed in the respective divided areas when the operation instructing patterns are displayed. Accordingly, operations can be simultaneously instructed although different types of simulated music instruments are played. As a result, a harmonic atmosphere of concert can be engendered.

Further, the evaluating means 307 evaluates the operations of the simulated musical instruments based on the correlation between the instructions given by means of note bars and the operations of the simulated instruments in response to the given instructions. This further arouses the game players' aspiration to progress, making the game more interesting.

The background music waveform data from which only the drum sounds are extracted is adopted when the drum playing mode is selected by the mode selecting means 302, whereas the background music waveform data from which the drum and guitar sounds are extracted is adopted when the session mode is selected thereby. The adopted data is outputted as a background music. Thus, the game player can feel united with the music being played when satisfactory operating the simulated musical instrument. Conversely, if the game player makes an erroneous operation, he can be surely aware of his mistake since the sound of the simulated musical instrument he is playing is not outputted or a wrong sound out of tune with the background music is outputted. As a result, the game can be made even more interesting.

As described above, the reference bars or the reference mark are displayed at one side of the display screen of the monitor 11, and the note bars are scroll-displayed at the specified speed from the other side toward the reference bars or the reference mark. This enables the game players to foresee or predict the operations of the simulated musical instruments, serving as a suitable guide for the operations.

Further, since the note bars corresponding to the operation of the simulated drum set 20 are scrolled up from the upper side of the display screen, the game player needs not fix his eye at the bottom part of the display screen. Thus, the game player can easily play the simulated drum set 20. Since the note bars corresponding to the operation of the simulated guitar 40 are scrolled down from the lower side of the display screen, it is easier to see various buttons of the simulated guitar 40 for operations. Thus, the game player can easily play the simulated guitar 40.

Since the sizes of the indicators and the like displayed on the display screen of the monitor 11 are changed according to the number of the simulated musical instruments, a plurality of operation instructing patterns can be displayed thereon within such a range that they are not difficult for the game players to see.

Although at least the simulated drum set is played in the foregoing embodiment, it is possible to provide a mode in which only the simulated guitar is played. Further, the game system may be such that other simulated musical instruments are played instead of the simulated drum set and the simulated guitar. In such a case, it is preferable to scroll down the note bars from the upper side of the display screen if the simulated musical instrument is of the type which can be held by hand such as the simulated guitar 40. Further, it is preferable to scroll up the note bars from the lower side of the display screen if the simulated musical instrument is of the fixed type such as the simulated drum set 20.

Figure 15:
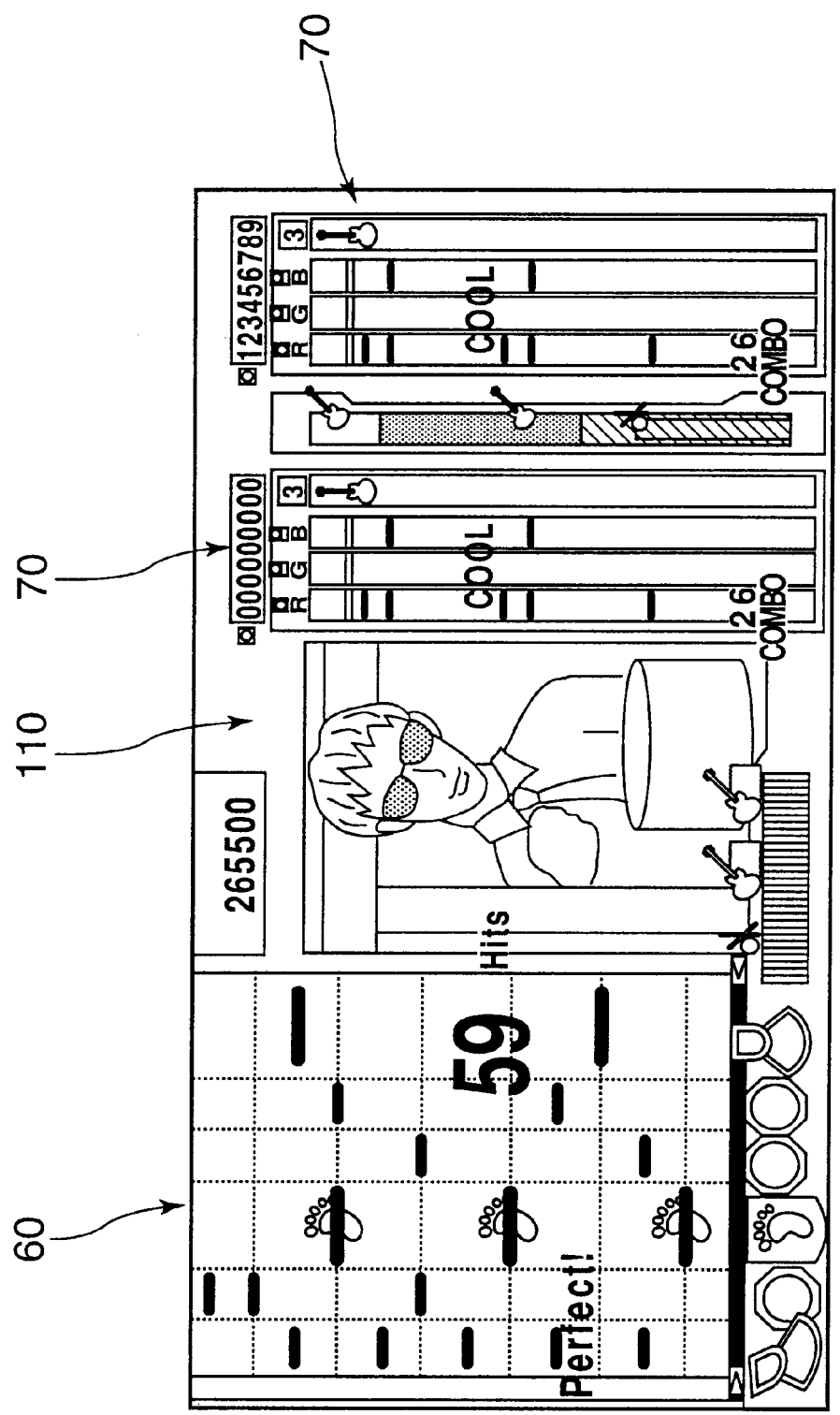
FIG. 15 is a diagram showing still another game screen.

The monitor 11 is not only a monitor of a standard television whose display screen has an aspect ratio of 3:4, but may be a monitor of a so-called wide television whose display screen has an aspect ratio of 9:16. In such a case, an extra space is left in lateral dimension of the game screen 50 shown in FIGS. 5 and 6 since the display screen of the wide television is laterally longer than that of the standard television. Therefore, animated images 110 or the like can be displayed as shown in FIG. 15, for example, between the drum indicator 60 and the guitar indicator 70.

Summarizing the aforementioned descriptions, a music playing game apparatus according to the present application, comprises: background music reproducing means for reproducing a background music chosen from a plurality of background music stored in a storage medium; display means for displaying an image stored in the storage medium; control means for reading from a content of recorded information in the storage medium that stores a plurality of simulated music instruments to be played by a player and for executing a predetermined operation to the display means and the background music reproducing means upon receiving an operation signal from the simulated music instrument. The aforementioned control means includes: a pattern storage unit for storing operation instruction pattern for instructing an operation with the simulated music instrument; a music playing sound information storage unit for storing playing sounds of the simulated music instrument so as to correspond to each operation instruction pattern; a display control unit for dividing the display area into sections whose number is in accordance with the number of the simulated music instruments, for reading out the operation instruction pattern corresponding to the background music to be reproduced, and for displaying the operation instruction patterns in synchronism with the reproduced music in divided sections respectively; and a playing sound output unit for reading out and outputting a playing sound from the playing sound information storage unit, the playing sound corresponding to the operation instruction signal at a time of operation of the music instrument in accordance with the operation instruction pattern displayed on the display control unit.

As described above, according to the present invention, a plurality of types of simulated musical instruments are prepared, the operation instructing patterns corresponding to the number of the simulated musical instruments used are prepared, and the display area of the display means is divided and the operation instructing patterns of the simulated musical instruments are displayed in the respective divided sections when the operation instructing patterns are displayed. Accordingly, operations can be simultaneously instructed although different types of simulated music instruments are played. As a result, a harmonic atmosphere of concert can be engendered.

The control means of the aforementioned music playing game apparatus may further include an evaluation unit for evaluating the operation of the music instrument in view of a comparison between the instruction given by the operation instruction pattern and the operation of the simulated music instrument in response to the instruction of the operation instruction pattern.

Since the game system not only lets the game player operate the simulated musical instrument, but evaluates his operation, the game player's aspiration to progress is further aroused, making the game more interesting.

The background music reproducing means may reproduce the background music excluding the sound of the simulated music instrument to be played by the player.

If the first and second simulated musical instruments are simultaneously operated, the background music from which the sounds of the first and second simulated musical instruments are extracted is reproduced. Thus, the game player can feel united with the music being played when satisfactory operating the simulated musical instrument. Conversely, if the game player makes an erroneous operation, he can be surely aware of his mistake since the sound of the simulated musical instrument he is playing is not outputted. As a result, the game can be made even more interesting.

The display control unit displays the operation instructing patterns in such a manner as to scroll at the specified speed toward the reference mark displayed at one side of the display area of the display means from the other side. This enables the game players to foresee or predict the operations of the simulated musical instruments, serving as a suitable guide for the operations.

The display control unit may be so constructed as to set a scrolling direction of the operation instruction pattern in accordance with the music instruments.

Since the display control unit sets the scrolling direction of the operation instructing patterns displayed on the display means according to the type of the simulated musical instrument, suitable instructions in conformity with the performance mode of the simulated musical instrument can be given for the operations.

The simulated music instruments may include a simulated guitar and a simulated drum and the display control unit scrolls the operation instruction pattern corresponding to the simulated guitar from a bottom to top and scrolls the operation instruction pattern corresponding to the simulated drum from the top to the bottom.

For example, if the simulated musical instrument is of the type which can be held by hand such as the simulated guitar, the game player needs not fix his eye at the lower side of the display screen by scrolling the operation instructing pattern corresponding to such a simulated musical instrument up from the lower side and, accordingly, can more easily play this simulated musical instrument. If the simulated musical instrument is of the fixed type such as the simulated drum set, the operable members of the simulated musical instrument (simulated drum set) are easier to see by scrolling the operation instructing pattern corresponding to such a simulated musical instrument down from the upper side and, accordingly, the game player can more easily play this simulated musical instrument.

The display control unit is so constructed as to change a size of each of the sections of the display area in accordance with the number of the music instruments.

Since the display control unit changes the sizes of the respective divided display sections on the display means according to the number of the simulated musical instruments, a plurality of operation instructing patterns can be displayed on the display means to such an extent that they are not difficult for the game players to see.

The display means can be so constructed as to display in a first display mode and a second display mode, the displayed image on the second display mode is longer in a horizontal direction than that on the first display mode, the pattern storage means stores an image of the first operation instruction pattern for the first display mode and an image of the second operation instruction pattern for the second display mode, the display control unit displays the first operation instruction pattern when the first display mode is selected and displays the second operation instruction pattern when the second display mode is selected.

The game can be enjoyed not only in the first display mode, but also in the second display mode that shows an image laterally longer than that shown in the first display mode.

The display area may include a display section that displays a predetermined image in addition to the second operation instruction pattern when the second display mode is selected.

For example, if the second display mode is selected, additional images such as animated images can be displayed on the display screen which is displayed when the first display mode is selected. As a result, the display screen displayed on the second display mode can present images more suitable for the performance of the simulated musical instruments.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

This application is based on Japanese application serial No. HEI 11-310586 filed in Japan on Nov. 01, 1999, the contents of which are hereby incorporated by reference.

What is claimed is:

1. A music playing game apparatus comprising:
    background music reproducing means for reproducing a background music chosen from a plurality of background music stored in a storage medium;
    display means for displaying an image stored in the storage medium;
    control means for reading a plurality of simulated music instruments to be played by a player and a content of recorded information in the storage medium for executing a predetermined operation to the display means and the background music reproducing means upon receiving an operation signal from the simulated music instrument; said control means including:
        a pattern storage unit for storing operation instruction pattern for instructing an operation of the simulated music instrument;
        a music playing sound information storage unit for storing playing sounds of the simulated music instrument so as to correspond to each operation instruction pattern;
        a display control unit for dividing the display area into display sections whose number is in accordance with the number of the simulated music instruments, for reading out the operation instruction pattern corresponding to the background music to be reproduced, and for displaying the operation instruction patterns in synchronism with the reproduced music in divided sections respectively; and
        a playing sound output unit for reading out and outputting a playing sound from the playing sound information storage unit, the playing sound corresponding to the operation instruction signal at a time of operation of the music instrument in accordance with the operation instruction pattern displayed on the display control unit.

2. The music playing game apparatus according to claim 1, wherein the control means further includes an evaluation unit for evaluating the operation of the music instrument in view of a comparison between the instruction given by the operation instruction pattern and the operation of the simulated music instrument in response to the instruction of the operation instruction pattern.

3. The music playing game apparatus according to claim 1, wherein the background music reproducing means reproduces the background music excluding the sound of the simulated music instrument to be played by the player.

4. The music playing game apparatus according to claim 1, wherein the display control unit displays a reference mark on one side of the display area and the operation instruction pattern scrolling from the other side of the display area to the reference mark at a predetermined speed.

5. The music playing game apparatus according to claim 1, wherein the display control unit sets a scrolling direction of the operation instruction pattern in accordance with the music instruments.

6. The music playing game apparatus according to claim 5, wherein the simulated music instruments includes a simulated guitar simulating a guitar and a simulated drum simulating a drum and the display control unit scrolls the operation instruction pattern corresponding to the simulated guitar from a bottom to top and scrolls the operation instruction pattern corresponding to the simulated drum from the top to the bottom.

7. The music playing game apparatus according to claim 1, wherein the display control unit changes a size of each of the sections of the display area in accordance with the number of the music instruments.

8. The music playing game apparatus according to claim 1, wherein the display means displays in a first display mode and a second display mode, the displayed image on the second display mode is longer in a horizontal direction than that on the first display mode, the pattern storage means stores an image of the first operation instruction pattern for the first display mode and an image of the second operation instruction pattern for the second display mode, the display control unit displays the first operation instruction pattern when the first display mode is selected and displays the second operation instruction pattern when the second display mode is selected.

9. The music playing game apparatus according to claim 8, wherein the display area includes a display section that displays a predetermined image in addition to the second operation instruction pattern when the second display mode is selected.

10. A performance guiding image display method for displaying in a display means an image stored in a storage medium in synchronism with a reproduction of a background music selected from a plurality of background music stored in the storage medium, and performing a predetermined operation to the image display means upon receiving operation signals from a plurality of music instruments to be played by player, said method comprising the steps of:

dividing the display area of the image display means into a plurality of sections;

displaying in the plural sections respectively the operation instruction patterns for the simulated music instruments corresponding to the reproduced background music in synchronism with the reproduced background music; and outputting a playing sound corresponding to the operation instruction pattern for the playing sound of the music instrument stored in the storage medium so as to correspond to respective operation instruction patterns when the simulated music instrument is operated in accordance with the operation instruction pattern displayed on the display means.

11. A readable storage medium for storing a program of forming a performance guiding image which displays in a display means an image stored in a storage medium in synchronism with a reproduction of a background music selected from a plurality of background music stored in the storage medium, and performing a predetermined operation to the image display means upon receiving an operation signal from a plurality of music instruments to be played by player, said storage medium comprising the steps of:

a step for dividing the display area of the image display means into a plurality of sections;

a step for displaying in the plural sections respectively the operation instruction patterns for the simulated music instruments corresponding to the reproduced background music in synchronism with the reproduced background music; and a step for outputting a playing sound corresponding to the operation instruction pattern for the playing sound of the music instrument stored in the storage medium so as to correspond to respective operation instruction patterns when the simulated music instrument is operated in accordance with the operation instruction pattern displayed on the display means.

\* \* \* \* \*